March 1, 1955

H. R. SWINGLE 2,702,979

SORGHUM TOPPER

Filed Oct. 28, 1952

INVENTOR
HAROLD R. SWINGLE
BY Parker and Walsh
ATTORNEYS

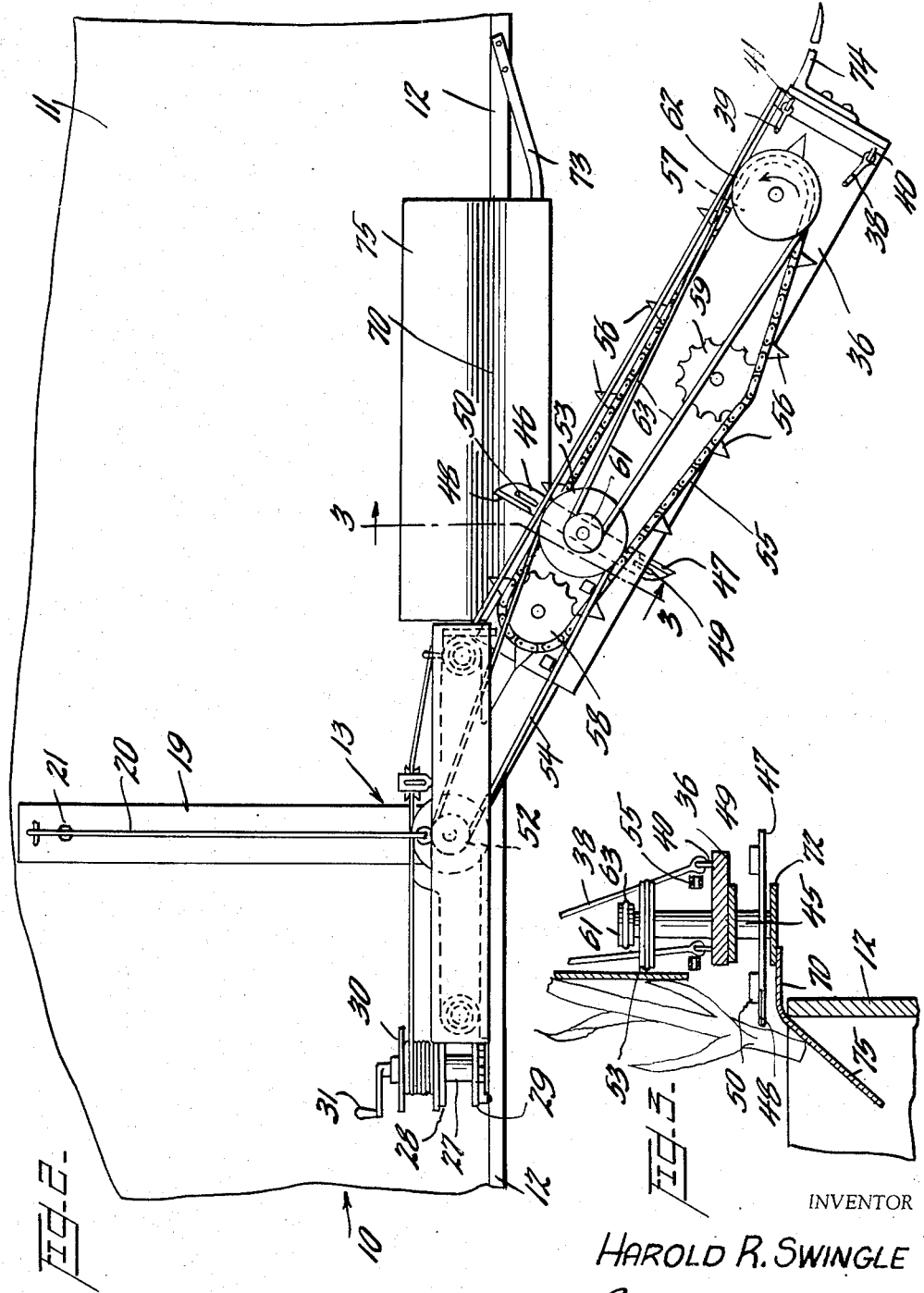

United States Patent Office

2,702,979
Patented Mar. 1, 1955

2,702,979

SORGHUM TOPPER

Harold R. Swingle, Zenda, Kans.

Application October 28, 1952, Serial No. 317,182

5 Claims. (Cl. 56—59)

This invention relates to apparatus for topping sorghum.

A principal object of the invention is the provision of sorghum topping apparatus in the form of a unitary self-contained attachment which can be quickly and easily attached to, or removed from, the body of a truck, wagon, or similar type of conveyance, thereby eliminating the relatively costly and complicated mobile type of apparatus generally used for this purpose.

A further object of the invention is the provision of a unitary attachment of the indicated type which can be readily transferred from one truck or wagon to another and which, when not in use, can be stored in a relatively small space.

A still further object of the invention is the provision of apparatus of the indicated type which is simple and economical to manufacture and assemble, easy to install and operate, and cheap to maintain.

Another object of the invention is the provision of apparatus of the indicated type which can be adjusted easily and quickly to a desired height by manual or power means in accordance with the height of the plants to be topped.

Still another object of the invention is the provision of apparatus of the indicated type provided with unitary means for topping the sorghum and for delivering the cut heads into the body of a wagon or truck on which the apparatus is mounted.

A further object of the invention is the provision of apparatus of the indicated type embodying means for preventing the heads of the sorghum plants from interfering with the working parts of the apparatus, prior to or after cutting.

A still further object of the invention is the provision of apparatus of the indicated type embodying self-contained power means for operating same and so constructed and arranged that it may be moved through a field, at any desired speed, to top or head sorghum, with a minimum of interference with the field cutter, which usually follows closely behind the sorghum topper.

These and other objects and advantages of the invention will become more apparent from the following detailed description, taken with the accompanying drawings, wherein:

Figure 2 is a top plan view of the apparatus shown in Figure 1.

Figure 3 is a cross-sectional view of the apparatus taken on the line 3—3 of Figure 2.

Figure 1:
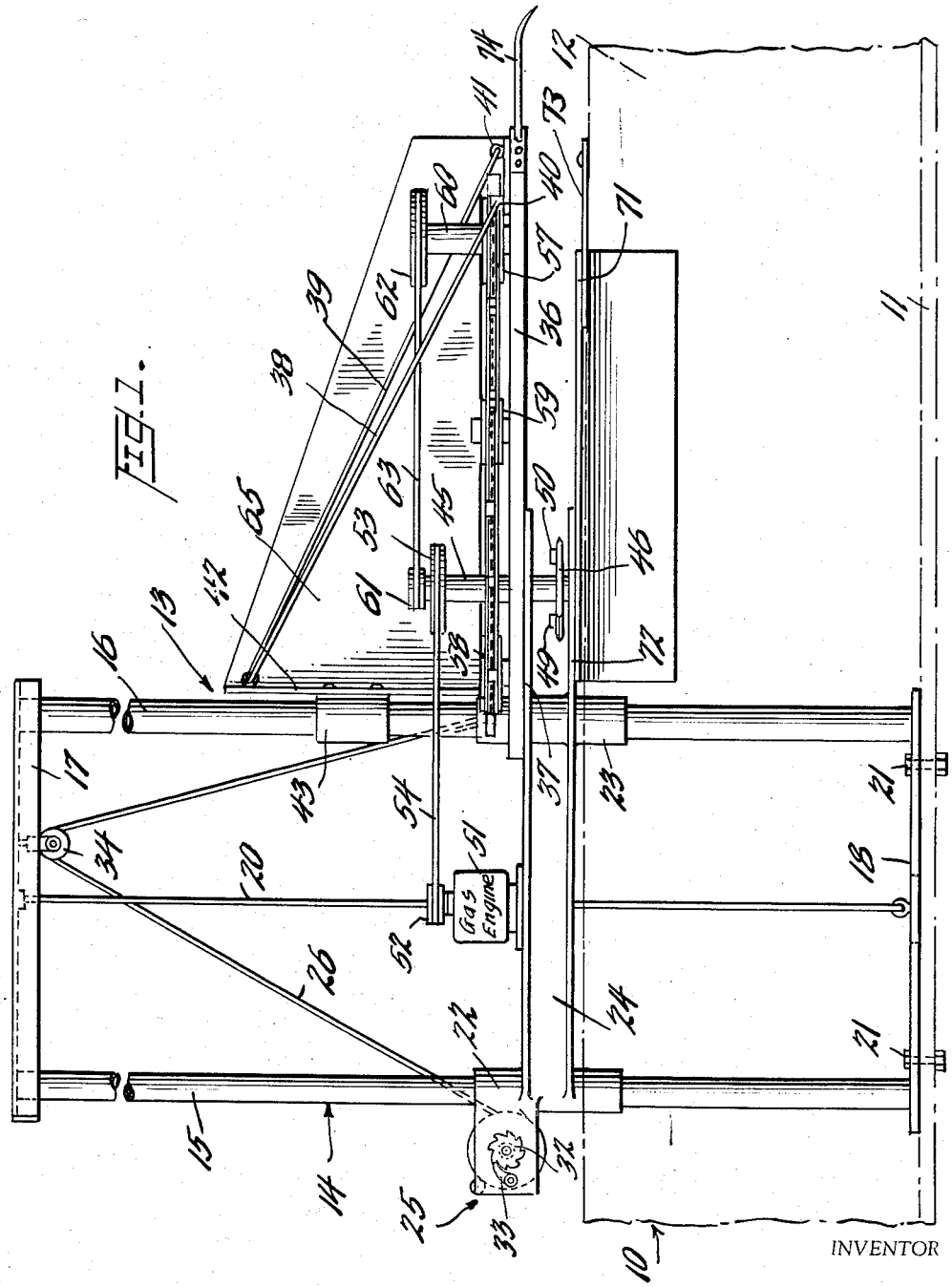
Figure 1 is a side elevational view of the apparatus mounted in the body of a wagon or truck, portions of the latter being shown in broken lines.

Referring to the drawings, the numeral 10 designates a portion of a truck or wagon body having a substantially flat bed or bottom 11 and sides 12. The numeral 13 generally designates the improved attachment device of the invention, which is adapted to be mounted in the body 10 adjacent one side thereof and bolted, or otherwise secured, to the bottom 11.

The attachment device 13 comprises a supporting stand or frame 14 which preferably consists of the uprights 15 and 16, upper and lower cross members 17 and 18, a laterally extending foot plate 19, and a bracing rod 20. The foot plate 19 is welded, bolted or otherwise secured to an intermediate portion of the lower cross member 18 and extends laterally therefrom, as clearly shown in Figure 2, to provide therewith a T-shaped supporting base for the frame 14. The bracing rod 20 is connected to the upper cross-member 17 and the outer end of the foot plate 19 and extends therebetween to reinforce and brace the frame. The members 18 and 19 are provided with suitable openings therethrough for receiving bolts 21 to secure the attachment device to the body 10.

The uprights 15 and 16 are preferably tubular members and may desirably be formed from, for example, 2″ tubing or pipe. Elongated collars or sleeves 22 and 23 are slidably mounted on the uprights 15 and 16 for adjustable movement therealong in a manner hereinafter described. A transverse supporting member 24 is welded or otherwise secured to the collars 22 and 23 and forms therewith a unitary structure. The supporting member 24 may have any desired cross-sectional shape and in one form may comprise a steel I-beam, or any similar arrangement, which will provide the desired strength and rigidity.

The unitary structure comprising the sleeves 22 and 23 and the transverse supporting member 24, may be raised and lowered in any suitable manner, as by the winch 25 and cable 26. The winch 25 may be of any well-known type and, as illustrated, comprises a shaft 27, rotatably mounted in flanged extensions 28 and 29, secured to, and projecting outwardly from, the sleeve 22. A drum 30 is carried by the shaft 27 and a handle 31 is provided for rotating the shaft to wind the cable 26 on the drum. The shaft 27 also carries a ratchet 32 which cooperates with a pawl 33 to hold the winch in any desired adjusted position.

The cable 26 is trained over a pulley 34, secured to and depending from, the upper cross-member 17, and has its end secured to the sleeve 23 in any suitable manner. It will thus be apparent that when the cable 26 is wound on the drum 30, the unitary structure, comprising the sleeves 22 and 23 and the supporting member 24, will be raised. Conversely, when the cable 26 is unwound from the drum 30, the member 24 will be lowered.

The topping mechanism, hereinafter described, is carried by a horizontally extending base member 36. The member 36, in turn is carried by, and secured to, a horizontal extension 37 of the supporting member 24, such extension preferably being integrally attached to the member 24 and extending laterally outwardly therefrom at an acute angle thereto. At its outer end, the base member 36 is supported and braced by rods 38 and 39, secured thereto as at 40 and 41. The rods 38 and 39 extend upwardly and inwardly from their points of connection with the base member 36 and are connected at their inner ends to a vertically extending post 42, which may desirably comprise an angle iron. The post 42 is rigidly connected by welding, bolts or the like, to the sleeve 23, from which it extends vertically upward adjacent and parallel to the upright 16. The post 42 is further connected to a sleeve 43, slidably mounted on the upright 16 above the sleeve 23.

A vertical shaft 45 is rotatably mounted in the base member 36 and extension 37, and carries at its lower end a two-bladed cutting member 46 having opposed cutting edges 47 and 48. As will be apparent from Figures 2 and 3, when the cutting member 46 is rotated, the cutting edges 47 and 48 thereof move outwardly beyond the inner edge of the base member 36 to engage and sever the heads of the sorghum plants.

An important feature of the invention is the provision of means, associated with the cutting member 46, for engaging the severed heads of the plants to throw them into the body of the wagon or truck. Such means comprise flanges 49 and 50, secured to the upper surface of the cutting member rearwardly of the cutting edges 47 and 48, and extending upwardly therefrom and longitudinally thereof, as clearly shown in Figures 1 and 3. The flanges 49 and 50 effectively function to throw the severed heads into the wagon or truck body, thereby eliminating the extra labor required to collect the heads when they are discharged on the ground in the usual manner.

The shaft 45, and the cutting member 46 carried thereby, are rotated at any desired speed by a gasoline engine 51, mounted on and secured to the supporting cross member 24. For this purpose, a small pulley 52 is mounted on the shaft of the gasoline engine 51, and drivingly connected to a larger pulley 53, mounted on the shaft 45, by a belt 54. By suitably regulating the speed of the engine 51, it will be apparent that the cutting member 46 may be rotated at any desired number of revolutions per minute entirely independently of the rate of movement of the apparatus through a field of sorghum.

To assist in guiding and moving the tops of the sorghum plants into the path of the rotating cutting member 46, a gathering chain 55 is provided. The chain 55 is equipped with plant engaging fingers 56, secured thereto at spaced intervals, and projecting outwardly therefrom for engagement with the plants as the chain moves inwardly along the inner edge of the base member 36 toward the cutting member 46. Sprockets 57, 58 and 59 are provided for movably supporting the chain and these sprockets are mounted on shafts rotatably journaled in the base member 36. Movement is imparted to the chain by a belt and pulley drive from the engine driven shaft 45 to the shaft 60, on which the sprocket 57 is mounted. This drive consists of pulleys 61 and 62, mounted respectively on the shafts 45 and 60, and drivingly connected by a belt 63. Thus the engine 51 drives the shaft 45 to rotate the cutter member 46, and the shaft 45, in turn, drives the shaft 60 to move the chain 55 at a speed corresponding to the speed of rotation of the cutting member.

Along the inner plant engaging edge of the base member 36, and extending upwardly therefrom, is a shield 65, preferably formed of sheet metal. The shield 65 is secured at its inner edge to the post 42 and at its outer lower edge to the base member 36. The shield 65 may also be secured to the bracing rod 39 or otherwise additionally supported as desired. The lower edge of the shield 65 is spaced upwardly from the base member 36 to provide an elongated opening therebetween through which the fingers 56 of the gathering chain 55 may project to engage the plants. The purpose of the shield 65 is to prevent the heads of the plants from getting into the pulleys or other parts of the mechanism, and, in addition, to assist the discharge of the severed heads into the body 10 of a truck or wagon.

To further assist in the discharge of the heads into the body of the truck or wagon and thereby minimize the possibility of accidental discharge of the severed heads on the ground, a second shield 70 is provided. The shield 70 is carried by an arm 71, secured to an extension 72 of the supporting member 24, and extends laterally from the frame 14 at an acute angle to the base member 36, as clearly shown in Figure 2. This provides a converging opening between the edge of the shield 70, on the one hand, and the shield 65 and the inner edge of the base member 36, on the other hand, which directs the plants into the path of movement of the cutting edges of the rotating blade 46. To ensure that plants in the path of the apparatus are directed into this converging opening, guide members 73 and 74 are provided. The guide member 73 desirably comprises an extension of the arm 71, which extends beyond the outer end of the shield 70 and flares outwardly slightly to engage plants and move them into the converging opening. The guard member 74 may desirably comprise an arm, secured to the end of the base member 46, and extending outwardly therefrom for moving plants on this side of the apparatus into the opening.

As clearly shown in Figure 3, the shield 70 extends laterally horizontally from the supporting arm 71 over the side 12 of the wagon or truck body 10. It is then preferably inclined downwardly as shown at 75, inwardly of the side 12, so that the severed heads discharged thereon will slide downwardly thereover into the body of the truck or wagon.

Operation

The attachment 13 may quickly and easily be mounted in the body of a truck or wagon and secured thereto by means of three or more bolts 21, which pass respectively through openings in the members 18 and 19 and co-mating openings in the bottom of the truck or wagon body, provided therein for this purpose. The topping mechanism is then readily adjusted by the winch 25 in accordance with the heighth of the sorghum plants to be topped, the gasoline engine 51 started, and the speed thereof adjusted to correspond to the desired rate of movement of the apparatus through the field of sorghum.

As the apparatus is moved through a sorghum field, the plants directly in the path thereof are guided into the path of rotation of the cutting blade by the guide members 73 and 74, the inner edge of the shield 70, the inner surface of the shield 65, and the inner edge of the base member 36. The fingers 56 assist in moving the plants toward the cutter member and in holding them in cutting position as they are struck by the cutting edges.

As the heads are severed from the plants, they are struck by the flanges 49 and 50 and thrown into the body of the wagon. During this operation the shield 65 prevents the tops of the heads from becoming entangled with the working parts of the mechanism and the shield 70 assists in guiding the heads into the body of the truck and serves to prevent any of them from falling on the ground. The shield 65, in addition, prevents the plants from becoming entangled with the pulleys and other working parts of the mechanism while they are moving to cutting position.

When mounted on a truck, the apparatus can be moved through a field to effectively top the sorghum plants at speeds up to about 10 miles per hour. As the rate of movement of the apparatus is increased, the speed of rotation of the cutting member and speed of movement of the chain are correspondingly increased merely by regulating the speed of the gasoline engine 51. This insures effective topping of the sorghum at any desired rate of speed thereby enabling the apparatus to operate ahead of a field cutter without interference therewith.

When the truck or wagon has been filled, the apparatus may be quickly and easily transferred to another vehicle body, or alternatively the load may be dumped at any suitable point and the topping operation continued with the same vehicle. In either event, the amount of time required is a minimum and does not seriously interfere with the substantially continuous operation of harvesting the sorghum crop.

It will thus be seen that the present invention provides a relatively simple attachment apparatus for topping sorghum which can be readily attached to or detached from the body of an ordinary truck or wagon. The device is highly effective in operation, easy to install and manipulate, and requires a minimum of maintenance. When not in use, the device can be stored in a relatively small space, and, as contrasted with prior mobile type devices for this purpose, represents a relatively small investment for the farmer.

While a preferred embodiment of the apparatus has been disclosed, the invention should not be construed as limited to the specific details illustrated and described, except as included in the following claims.

I claim:

1. Apparatus for topping sorghum comprising a frame, means for removably mounting the frame on the bed of a truck or wagon body, a horizontally disposed supporting member mounted on the frame and being vertically movable to different operative positions thereon, said supporting member having a horizontal extension thereon adjacent one end thereof, a horizontally disposed base member secured to said extension and projecting outwardly therefrom at an angle to said supporting member, a cutter blade rotatably mounted on said base member, a gathering chain mounted on said base member for moving plants into the path of said cutter blade, and inter-connected means for simultaneously rotating said cutter blade and moving said gathering chain.

2. Apparatus for topping sorghum comprising a frame, means for removably mounting the frame on the bed of a truck, wagon, or similar type of vehicle, a horizontally disposed supporting member mounted on the frame for movement therealong in a vertical direction, a base member carried by the supporting member and extending laterally outwardly therefrom at an acute angle thereto, a cutter blade rotatably mounted on said base member and having cutting edges thereon movable outwardly beyond an edge of the base member, a gathering chain mounted on said base member and movable along said edge thereof to carry plants into the path of movement of said cutting edges, mechanism carried by said base member for operating said cutter blade and gathering chain, and a shield mounted on said frame and extending outwardly therefrom adjacent to said edge, said shield having a portion thereof extending upwardly from said base member to keep plants out of said operating mechanism.

3. Apparatus for topping sorghum comprising a frame, means for removably mounting the frame on the bed of a truck, wagon, or similar type vehicle, a horizontally disposed supporting member carried by the frame and movable vertically thereon to different operative positions, a horizontally disposed base member secured to the supporting member and extending laterally outwardly therefrom at an acute angle thereto, a cutter blade rotatably mounted on the base member, a gathering chain movably mounted on the base member for moving the tops of plants toward the cutter blade, one run of said chain being positioned adjacent an edge of said base member, a vertically disposed shield positioned adjacent said edge of said base member, and a horizontally disposed shield positioned below said cutter member and having a downwardly inclined portion over which the tops of plants severed by said cutter member are adapted to slide into the body of a vehicle on which the apparatus is mounted.

4. Apparatus for topping sorghum comprising a frame having a base portion adapted to be secured to the body of a truck, wagon or similar type vehicle, a pair of spaced uprights secured to the base portion, a pair of sleeves slidably mounted on the uprights for vertical movement therealong to different operative positions, a transverse supporting member integrally connected to said sleeves for movement therewith, a horizontally disposed base member secured to said supporting member and extending outwardly therefrom at an acute angle thereto, a vertically disposed shaft rotatably mounted in said base member and carrying a cutter blade adjacent its lower end, said cutter blade being positioned below said base member, power means mounted on said supporting member for rotating said shaft and cutter blade, sprocket means rotatably mounted on said base member and disposed thereabove, a gathering chain mounted on said sprocket means and having one run thereof disposed adjacent a side edge of said base member, and driving means connecting said shaft and sprocket means for effecting movement of said gathering chain when said shaft is rotated.

5. A unitary attachment apparatus for trucks, wagons, and the like, comprising a frame having a base portion and a pair of spaced uprights secured to the base portion, means for removably attaching said base portion to the bed of a truck, wagon or the like, a pair of sleeves slideably mounted on the uprights for vertical movement therealong to different operative positions, a horizontally disposed transverse supporting member integrally connected to said sleeves for movement therewith, a horizontally disposed base member secured to said supporting member and extending outwardly therefrom at an acute angle thereto, a vertically disposed shaft rotatably mounted in said base member and extending therethrough, a cutter blade secured on said shaft adjacent the lower end thereof, power operated means mounted on said supporting member for rotating said shaft and cutter blade, a plurality of sprockets rotatably mounted on said base member and disposed thereabove, a gathering chain mounted on said sprockets and having one run thereof disposed for movement along a side edge of said base member, the path of rotative movement of said cutter blade projecting beyond said edge, driving means connecting said shaft and sprocket means for effecting movement of said gathering chain when said shaft is rotated, and a shield carried by said frame and extending laterally outwardly therefrom, said shield being disposed substantially vertically and having its lower edge positioned adjacent said edge of the base member.

References Cited in the file of this patent

UNITED STATES PATENTS

| Number | Name | Date |
|---|---|---|
| 968,655 | Hail | Aug. 30, 1910 |
| 1,053,401 | Jordan | Feb. 18, 1913 |
| 1,091,119 | Cannon | Mar. 24, 1914 |
| 2,439,278 | Wurtele | Apr. 6, 1948 |